US006550657B1

(12) United States Patent
Taguchi

(10) Patent No.: US 6,550,657 B1
(45) Date of Patent: Apr. 22, 2003

(54) APPARATUS AND METHOD OF PAPER SEPARATION FOR IMAGE FORMATION APPARATUS

(75) Inventor: Yoshiyuki Taguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/481,692

(22) Filed: Jan. 12, 2000

(30) Foreign Application Priority Data

Apr. 19, 1999 (JP) .......................................... 11-111447

(51) Int. Cl.[7] .......................... G03B 1/56; G03G 15/00
(52) U.S. Cl. ......................... 226/91; 399/388; 399/397
(58) Field of Search ........................... 226/91; 399/384, 399/388, 397

(56) References Cited

U.S. PATENT DOCUMENTS 4,014,487 A * 3/1977 Reba et al. ............... 226/91 X
4,478,508 A * 10/1984 Kato et al. .................. 399/384
4,904,344 A * 2/1990 Peiffer ...................... 226/91 X
5,633,703 A * 5/1997 Takenouchi et al. ........ 399/315
5,758,247 A * 5/1998 Yanashima et al. ......... 399/384
5,774,777 A * 6/1998 Ohtsuka et al. ............. 399/384
5,978,644 A * 11/1999 Sato et al. .................. 399/397
6,128,463 A * 10/2000 Matsumoto et al. .... 399/397 X

FOREIGN PATENT DOCUMENTS

| | | |
|---|---|---|
| JP | 2-238480 | 9/1990 |
| JP | 3-13444 | 1/1991 |
| JP | 5-20072 | 3/1993 |
| JP | 9-90775 | 4/1997 |

* cited by examiner

*Primary Examiner*—Michael R. Mansen
(74) *Attorney, Agent, or Firm*—Armstrong, Westerman, Hattori, McLeland & Naughton, LLP

(57) ABSTRACT

A method and an apparatus of paper separation are provided which permit a secure and reliable auto-loading operation of paper separation with a less complex mechanism of the apparatus. The paper separation apparatus has a paper separation body for separating a paper from a transfer body, a paper feeding supporter for holding the paper firmly and supporting the feed of the paper, and a link mechanism for moving the paper separation body toward a circumferential surface of the transfer body. The arrangement separates the paper from the transfer body in an auto-loading step and moves at least a portion of the paper feeding supporter to hold the separated paper firmly, so that the movement of the paper separation body is co-acted in synchronism with the movement of the paper feeding supporter.

15 Claims, 7 Drawing Sheets

POSITION B

POSITION C

APPARATUS AND METHOD OF PAPER SEPARATION FOR IMAGE FORMATION APPARATUS

BACKGROUND OF THE INVENTION

The present invention relates in general to a printer and more particularly to a paper separation (or release) apparatus and paper separation method which are applicable to an image or picture formation apparatus as a printer for printing and image formation on a continuous, sequence paper.

FIG. 8 shows a general structure of a high-speed printer for a continuous, sequence paper. In a case that a continuous, sequence paper is not set to this high speed printer, or in a case that discontinuous papers (in a bundle) are set by some unknown reasons in place of the continuous, sequence paper and therefore reset is to be made, a continuous, sequence paper P of a paper buffer portion 200 is set in an auto-load portion 201 and then a start switch for the auto-load portion (not shown) is put on, so that the paper P is automatically fed to a transfer portion 202, a fixture portion 203 and a stacker portion 204. By this operation, the continuous, sequence paper P is on a stand-by state for a printing operation. The serial, consecutive paper-loading operation is called as an auto-load operation.

Japanese Patent Publications (unexamined) No. 9-90775 (1997) and No. 3-13444 (1991) show structures in which a continuous, sequence paper P is fed from a transfer drum and guided to a fixture portion 203 and a stacker portion 204 through some guides. An example of such a guide construction and a pinch roller construction is shown in FIG. 9, by which a paper loading operation is conducted in the transfer portion 202 at the time of an auto-load operation. The paper P which is fed from an auto-load table portion (that is, a table provided in the auto-load portion 201 shown in FIG. 8) is fed by a lower pin 102 of transfer portion and then fed upward as it is closely contacted with the transfer drum 103. The paper P closely contacted with the transfer drum 103 is abutted against a guide 104, which has a minor gap (approximately, 0.8 mm) relative to the drum 103 and then released. Then, the paper P is pulled by the pinch roller 105 so that apertures of the paper P are engaged with upper pins 106 of the tractor of the transfer portion.

The pinch roller 105 is, as shown in FIG. 10, generally stands by at an upper portion of the feeding direction of the paper P. When the paper P is fed to advance by the auto-load operation, the pinch roller is moved upward relative to the feeding direction of the paper P and, as shown In FIG. 11, serves to hold the paper P to feed it toward the tractor upper pin 106.

However, as a continuous, sequence paper, which is usually referred as a continuous form P, has recently been used extensively and, when such a thin paper is used and fed into the transfer portion 202, it is likely that the thin paper is freely delivered through a space between the transfer drum 103 and the guide member 104 without a required contact by these members 103 and 104 with the result that there is a problem of unavailability of the auto-loading.

With respect to separation of a paper, an attempt was made to provide a paper releasing nail for releasing a paper as disclosed in Japanese Utility Model Publication (unexamined) No. 5-20072 (1993). However, this technique does not permit the paper to be released from a circumferential surface of the transfer drum and therefore is not a good measure for solving the problems described above. Further, Japanese Patent Publication (unexamined) No. 2-238480

(1990) discloses a structure in which a paper releasing nail is provided to a paper supporting drum which supports a paper for feeding, but this attempt does not release a paper from a circumferential surface of the transfer drum and, therefore, the aforementioned problems have not been solved yet. In view of the structural feature of the transfer drum, the paper releasing nail as described above sometimes provides damages on the surface of the drum at the time of releasing operation of the paper from the drum surface by the use of the nail and, therefore, results in damages in the circumferential surface of the drum and generation of undesirable noises in printing and image or picture. Thus, use of the paper releasing nail as described above results in deterioration of printing and image (picture) properties. In the structure disclosed in the above-described Publication No. 2-238480, the paper is released from the circumferential surface of the drum during the paper feeding operation by means of the releasing nail, and this is not a paper releasing from a circumferential surface of the transfer drum and, therefore, this method is applicable.

On the other hand, provided that there should be a suggestive structure of a paper-separation nail for separating a paper from the transfer drum, it must be that this structure will have the structure as follows. Namely, it must be constructed such that the paper release nail is contacted with the circumferential surface of the transfer drum 103 at the time of auto-loading mode only and, further, a paper releasing operation must be finished by the nail before the pinch roller is driven for the above-mentioned pulling operation. Apart from the operational structure of the pinch roller 105, if it is required to provide a controlling device for controlling the operation of the paper separation nail, additional mechanism must be provided for a synchronous operation with the pinch roller 105. This, however, will provide a new serious problem of complexity in mechanical structure.

SUMMARY OF THE INVENTION

In view of the foregoing, an object of the present invention is to provide an improvement in a method and apparatus of paper separation which permit a secure and reliable auto-loading operation of paper separation with less complex mechanism of the apparatus.

According to the present invention, there is provided a paper separation apparatus which comprises a paper separation body for separating a paper from a transfer body; a paper feeding supporter device for holding the paper firmly and supporting the feed of the paper; and a link mechanism for moving the paper separation body toward a circumferential surface of the transfer body so as to separate the paper from the transfer body in an auto-loading step and moving at least a portion of the paper feeding supporter device to thereby hold firmly the separated paper, so that the movement of the paper separation body is co-acted in synchronism with the movement of the paper feeding supporter device.

In the structure described above, when the continuous, sequence paper is fed to the transfer body at the time of the auto-loading operation, the paper separation body is moved toward the circumferential surface of the transfer body by means of the link mechanism, at the moment of which a movement of the paper feeding supporter can be started if desired, the paper is separated from the transfer body. Then, by the link mechanism, at least a part of the paper feeding supporter is further moved to thereby hold the separated paper by the paper feeding supporter and, after that, the paper feeding operation is enhanced by the paper feeding supporter.

As described above, the operation of the paper separation body and the operation of the paper feeding supporter are co-acted with each other in synchronism and this synchronized operation permits a reliable paper separation and auto-loading operation.

The paper feeding supporter device preferably includes at least a pinch roller but is not limited to this structure, and any other structure can be used so long as it can hold the continuous, sequence paper and feed the same to a lower portion of the structure. According to the present invention, it is defined in the claim that, by the link mechanism described above, at least a part of the paper feeding supporter device is moved. This means that if at least one of the rollers (preferably, a pinch roller) is moved by the link mechanism as defined in the claim, the remaining other roller can serve to hold the paper.

The paper separation body preferably has a paper separation nail which can release or separate the paper, and it is further preferred that the paper separation nail can be rotated in the paper feeding direction. By the rotational mechanism of the paper separation nail, no damage or injure is produced on the circumferential surface of the transfer body by the link mechanism when the paper separation nail is contacted with the circumferential surface of the transfer body.

In an embodiment of the paper separation apparatus, the structure comprises a paper feeding supporter device for holding a paper and supporting the paper to be fed; a link mechanism for moving at least a part of the paper feeding supporter device to thereby hold the paper in an auto-loading operation; and a paper separation body for separating the paper from the transfer body so that the link mechanism is operated in synchronism with the paper feeding supporter device to thereby move the paper separation body toward a circumferential surface of the transfer body and separate the paper from the transfer body immediately before the paper feeding supporter device holds the paper.

In this structure, the link mechanism which serves to move the paper feeding supporter device is provided with a function for moving synchronously the paper feeding supporter device with the paper separation body. These movements are operated by a single link mechanism and, therefore, an operational structure for the paper feeding supporter device is separately and independently provided from an operational structure for the paper separation body. In this structure, additional synchronism mechanism for synchronously operating these movements will not required.

In a further feature of the invention, there is provided a method which has the steps of separating a paper which has been fed by moving a paper separation body toward a circumferential surface of a transfer body, moving at least a part of a paper feeding supporter device in synchronism with the movement of the paper separation body, and holding the separated paper to thereby support a paper feeding operation.

DESCRIPTION OF THE PREFERRED EMBODIMENT

Preferred embodiments of the invention will be described with reference to the figures of the accompanying drawings.

In FIGS. 1 through 6 showing a paper separation apparatus according to an embodiment of the present invention, the paper separation apparatus is adaptable to a high-speed printer connected with a main frame and the like for the apparatus, and a paper separation is conducted for a continuous, sequence paper P at the time of the auto-loading operation by the printer.

Figure 1:
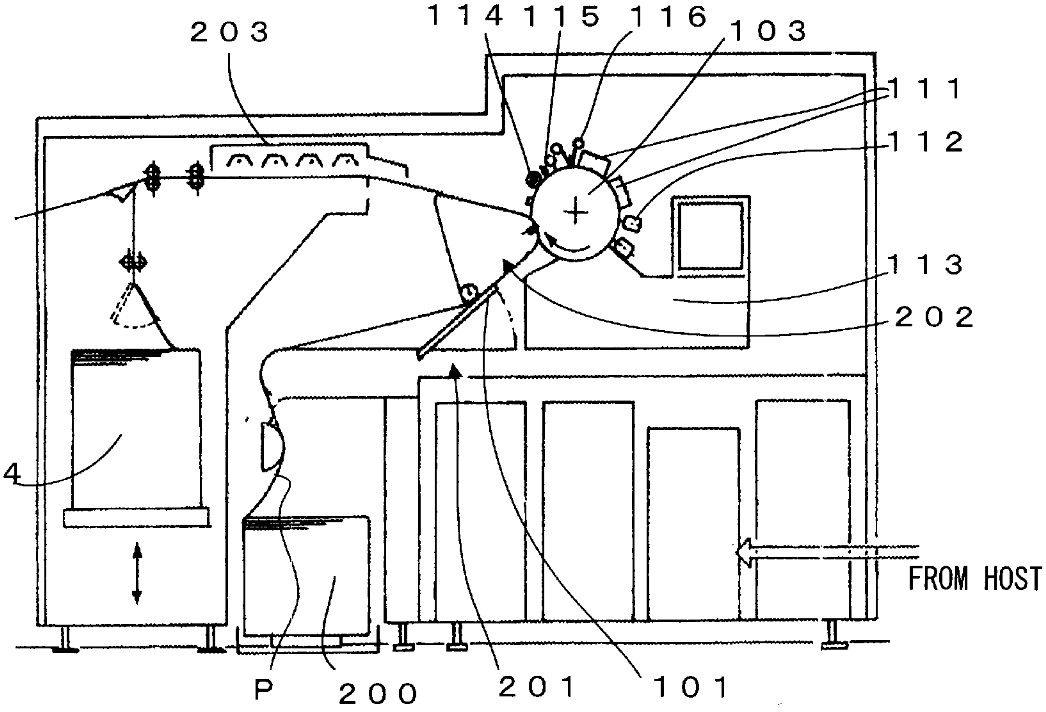
FIG. 1 is a diagrammatic view of an interior of a high-speed printer incorporating the structure of an embodiment of the invention.

In FIG. 1 showing an operation of paper loading in a transfer (picture transfer) at an auto-loading operation, a continuous, sequence paper P (in other words, a continuous form) is set to an auto-loading portion 201 (auto-loading table portion 101) and, when an auto-load starting switch (not shown) is switched on, the paper P is fed to the transfer portion 202. In other words, the paper is fed by a tractor lower pin 102 of a transfer portion and then transferred upward while it is closely contacted with a transfer drum 103. The paper P which is contacted with the transfer drum 103 is then separated or released from the transfer drum 103 by a paper separation nail 1 which will be described presently and then held between a pinch roller 2 and a driving roller 3 of rubber which is located below the pinch roller 2 and further to a downstream portion of the paper. After the holes or apertures of the continuous paper P are snugly adapted to a tractor upper pin 106 of the transfer portion, the paper P is fed further to a fixture portion 203 and a stacker portion 204 which are located downstream portion of the paper feed so that the paper P is placed in a stand-by posture for a printing operation.

In FIG. 1, the transfer portion 202 is composed mainly of the transfer drum 103 and its peripheral, optical picture (image) transfer elements, such as a precharge portion 111 which is set around the transfer drum 103 for charging the drum 103, an optical portion 112 which is composed of an LED array for optically irradiating or exposing an image (or a picture) toward the transfer drum 103 in accordance with image data transmitted from a host, a developer unit 113 which serves to affix particles such as a toner onto a latent image formed at the optical portion 112 to thereby form a printing image on the transfer drum 103, a cleaning brush 114, which may have a cleaning blade, for exclude the toner remaining on the transfer drum 103 after completion of a printing step on the paper P, a discharge LED 115 for the transfer drum 103, and a cleaning fleece 116.

Figure 2:
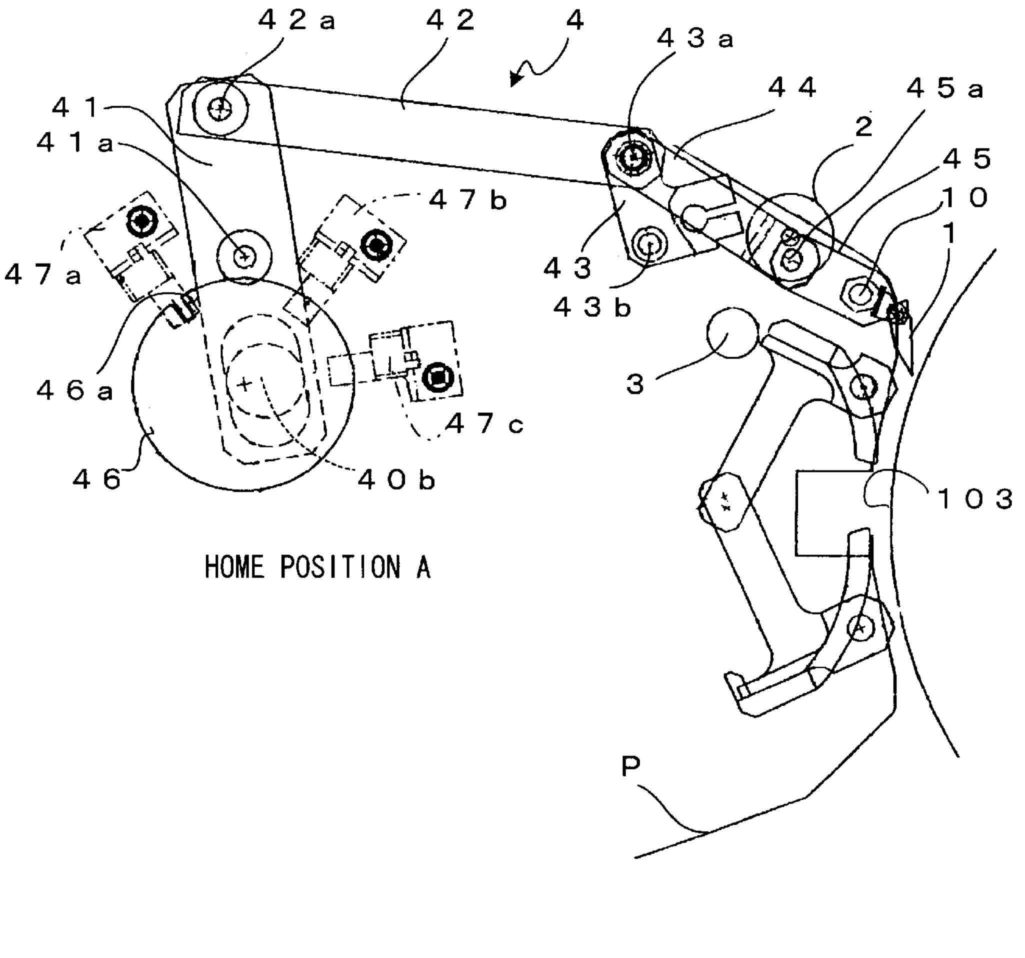
FIG. 2 is a diagram of a paper separation apparatus in a transfer portion designated at 202 according to the present invention showing a state of a home-position of the apparatus.

In FIG. 2 showing the paper separation apparatus according to the present invention which is set in the transfer portion 202 located adjacent to a circumferential surface of the transfer drum 103, the paper separation apparatus has a paper separation nail 1 which represents specifically the paper separation body, a pinch roller 2 and a lower driving roller 3 which in combination represent and serve as the paper feeding supporter device, and a link mechanism 4. The basic frame 110 of the transfer portion is provided with, as described in detail presently, the aforementioned link mechanism 4 which has a pivotal axis 41*a* of a first link 41, a pivotal axis 43*b* of a third link 43 and a bearing 11 for pivotally support a rotational axis 10 of a fifth link 45.

Figure 3:
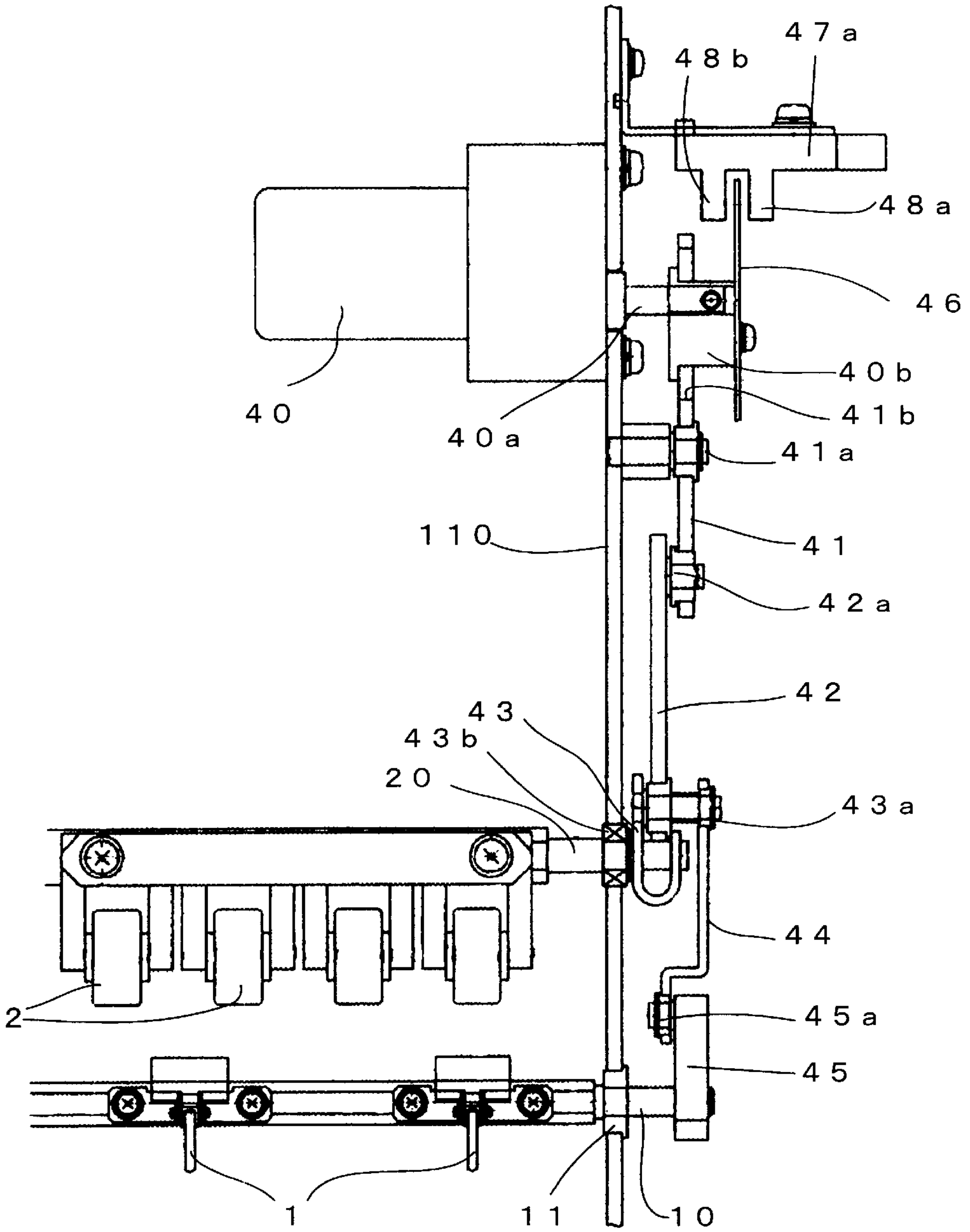
FIG. 3 is a plan view of the paper separation apparatus according to the present invention.

As shown in FIGS. 2 and 3, the paper separation nail 1 is provided, on an extended end portion of the fifth link 45, to the rotational axis 10 which is disposed perpendicularly relative to the fifth link 45 of the link mechanism 4.

Figure 5:
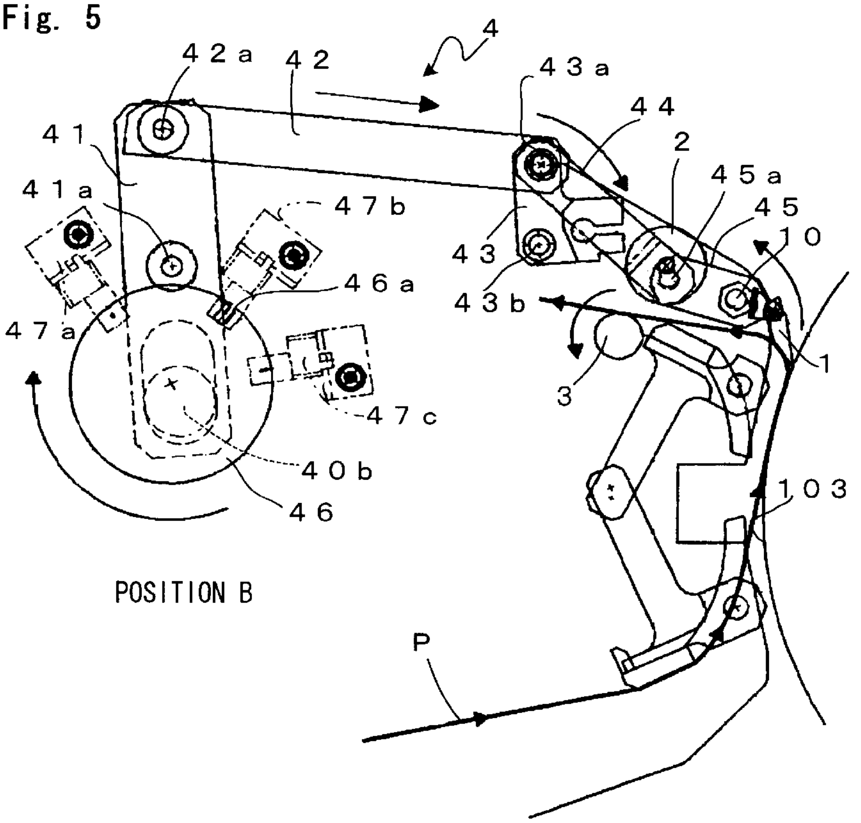
FIG. 5 is an explanatory diagram showing a state that the paper separation apparatus of the invention is conducting a paper separation operation at position B.

The rotational axis 10 is pivotally supported to the basic frame 110 of the transfer portion by the bearing 11, as shown in FIG. 3. Since the extended end of the rotational axis 10 is fixed to the fifth link 45, the rotational axis 10 is rotated at an axis of the bearing 11 by the rotation of the fifth link 45 and, as shown in FIG. 5, a tip end of the paper separation nail 1 can be contacted with a circumferential surface of the transfer drum 103.

Figure 4A:
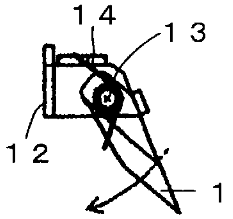
FIGS. 4A and 4B are explanatory diagrams showing the structure of a paper separation nail which is designated by reference numeral 1.
Figure 4B:
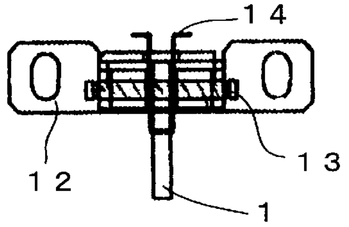

On the other hand, the paper separation nail 1 is fitted to an axis 13 of a metal member 12 through a spring 14, as shown in FIGS. 4A and 4B. Thus, in a normal state the paper separation nail 1 is held in a state as shown in FIG. 4A by a resilient force of a spring 14 but, at the same time, is rotatable in the direction shown by an arrow in the illustration at the axis 13. This rotatable structure is useful for prevention of generation of damages on the circumferential surface of the transfer drum 103 by the rotation of the paper separation nail 1 when the nail 1 contacts the circumferential surface of the transfer drum 103.

With respect to the pinch roller 2, a plurality of pinch rollers 2 are rotatably provided to a shaft 20 in an axially alignment posture as shown in FIG. 3, in which the shaft 20 is disposed perpendicular to the third link 43, at the other end of the third link 43 of the link mechanism 4 which will be described presently. Accordingly, since the third link 43 is rotated toward a transfer drum 103, the pinch rollers 2 are moved to the driving roller 3 of a rubber roller below the pinch rollers 2 and, finally, forced against the driving roller 3.

The link mechanism 4, which is shown in FIGS. 2 and 3, has a pinch roller compression motor 40 (DC motor) which is fixed to the base frame 110 of the transfer portion, a first link 41, a second link 42, a third link 43, a fourth link 44, and a fifth link 45. The first link 41 is eccentrically engaged with a spindle 40*a* of the DC motor 40 and rotatable about a point 41*a* extended from the base frame 110. The second link 42 is rotatable about a pivotal point 42*a* at the other end of the first link 41. The third link 43 is rotatable about a pivotal point 43*a* at the other end of the second link 42 and pivotally supported at a pivotal point 43*b* of the base frame 110 so that the third link 43 is rotatable about the pivotal point 43*b* in the direction of the transfer drum 103. The fourth link 44 is rotatable about the pivotal point 43*a* at the other side of the second link 42, and the fifth link 45 is rotatable about a pivotal point 45*a* at the other end of the fourth link 44.

Figure 6:
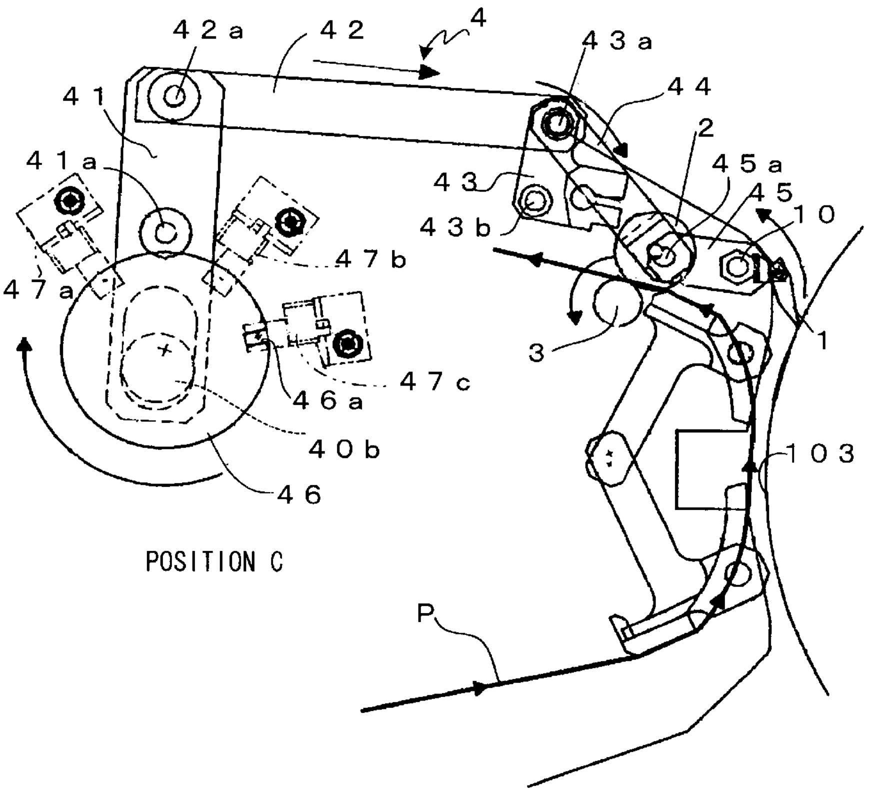
FIG. 6 is an explanatory diagram showing a state that the paper separation apparatus of the invention is conducting a paper-feed supporting operation at position C.

In the structure described above, the spindle 40*a* of the pinch roller compression motor 40 and the first link 41 are engaged with each other by the structure that an eccentric rotational body 40*b* is eccentrically fitted to the spindle 40*a* and the eccentric rotational body 40*b* is longitudinally movably disposed in an oblong engagement hole 41*b* of the first link 41. Since the first link 41 is rotatable about a point which is extended from the base frame 110, the first to fifth links 41–45 are all moved by a rotation of the spindle 40*a* as shown in FIGS. 5 and 6. This movement will be described presently.

In the structure described above, the spindle 40*a* is provided at its end with a circular plate or a disc 46 with a notch 46*a* for detecting a position. The pinch roller compression motor 40 has, on its circumferential portion, three position sensors 47*a*–47*c* at predetermined three positions as shown in FIG. 2. The position sensors 47*a*–47*c* have projections 48*a,* 48*b* which extend along the opposed sides of the disc 46 as illustrated in FIG. 3, and one of the projections 48*a,* 48*b* is provided with a light emitting portion (not shown) and the other is provided with a light receiving portion or receptor portion (not shown), and the notch 46*a* of the disc 46 is moved between them and when the light receiving portion receives an emitted light from the light emitting portion, it is determined that the disc 46 is rotated to the position of the sensors 47*a*–47*c,* and thus the rotational state of the link mechanism 4 is detected. The sensor 47*a* detects that the link mechanism 4 is located in the home position (that is, position A) as shown in FIG. 2. The sensor 47*b* detects that the link mechanism 4 is located in the position B of FIG. 5, and the sensor 47*c* detects the link mechanism in the position C of FIG. 6.

An operational mode of the apparatus having the structure as described above will be described with reference to FIGS. 2, 5 and 6.

The position A shown in FIG. 2 represents a normal, unoperational state of auto-loading (that is, home position). In this stage, the notch 46*a* of the disc 46 is detected by the sensor 47*a*. The pinch rollers 2 stand by at the position spaced from the driving roller 3. The paper separation nail 1 is spaced from the transfer drum 103 with a small gap therebetween.

Then the auto-loading start switch is pushed down to be switched on to execute an auto-loading operation, the pinch roller compression motor 40 is driven, so that the first link 41 is rotated at a center of the point 41*a* and its end is moved toward the transfer drum 103. Then, as shown in FIG. 5, the second link 42 is moved in the direction shown by an arrow (that is, toward the transfer drum 103), and the third link 43 starts to rotate in the direction of an arrow (that is, in the direction that the other end of the third link moves toward the paper delivery). At this moment, the pinch roller 2 is not contacted with the driving roller 3 or the paper P and positioned in a spaced relation. The fourth link 44 is also rotated in the same direction as the third link 43 at a center of the pivotal point 43*a*. The fifth link 45 is rotated in the direction of an arrow (in the direction that the pivotal point 45*a* moves toward the paper delivery direction) at a center of the bearing 11. By the rotation of the fifth link 45, the paper separation nail 1 is contacted with a circumferential surface of the transfer drum 103. In the state of position B as shown in FIG. 5, the notch portion 46*a* of the disc 46 is detected by the sensor 47*b*. Further, in this state, when the continuous paper P is fed toward the transfer drum 103 by a paper delivery motor (not shown), the end of the paper is contacted with the paper separation nail 1 and spaced from the transfer drum 103 and then fed toward the pinch roller 2.

When the pinch roller compression motor 40 is continuously driven, the first link 41 is further rotated at a center of the point 41*a* and, as shown in FIG. 6, the second link 42, the third link 43, the fourth link 44 and the fifth link 45 are continued to move in the direction of an arrow. In this instance, the continuous paper P is continuously fed by the paper delivery motor, and fed through between the pinch roller 2 and the driving roller 3, at which point the paper is stopped and held at a moment. Then, the third link 43 is rotated in the direction of paper delivery at a center of the pivotal point 43*b,* and the continuous paper P is then held by the combination of the pinch roller 2 and the driving roller 3, so that the driving roller aids the feeding of the continuous paper P and serves to feed it toward the upper tractor pin 106. At this moment, since the fifth link 45 is rotated further in the direction of an arrow, the paper separation nail 1 is rotated in the arrowed direction on FIG. 4B and the end of the nail 1 is kept contacted with a circumferential surface of the transfer drum 103 by means of a spring 14. In such a position as the position C in FIG. 6, detection of the notch portion 46*a* of the disc 46 is carried out by the sensor 47*a*. Then the feeding operation of the paper P is started again by the paper delivery motor.

By the operation as described above, the continuous paper P is separated from the circumferential surface of the transfer drum 103 in the auto-loading operation, and the continuous paper P is then automatically fed to the fixture portion 203 and the stacker portion 204. Thus, the continuous paper is positioned in the stand-by status and awaits the forthcoming printing operation. After the auto-loading operation, the pinch roller compression motor 40 is rotated in the reversal direction and returned to the home position shown in FIG. 2.

Figure 7:
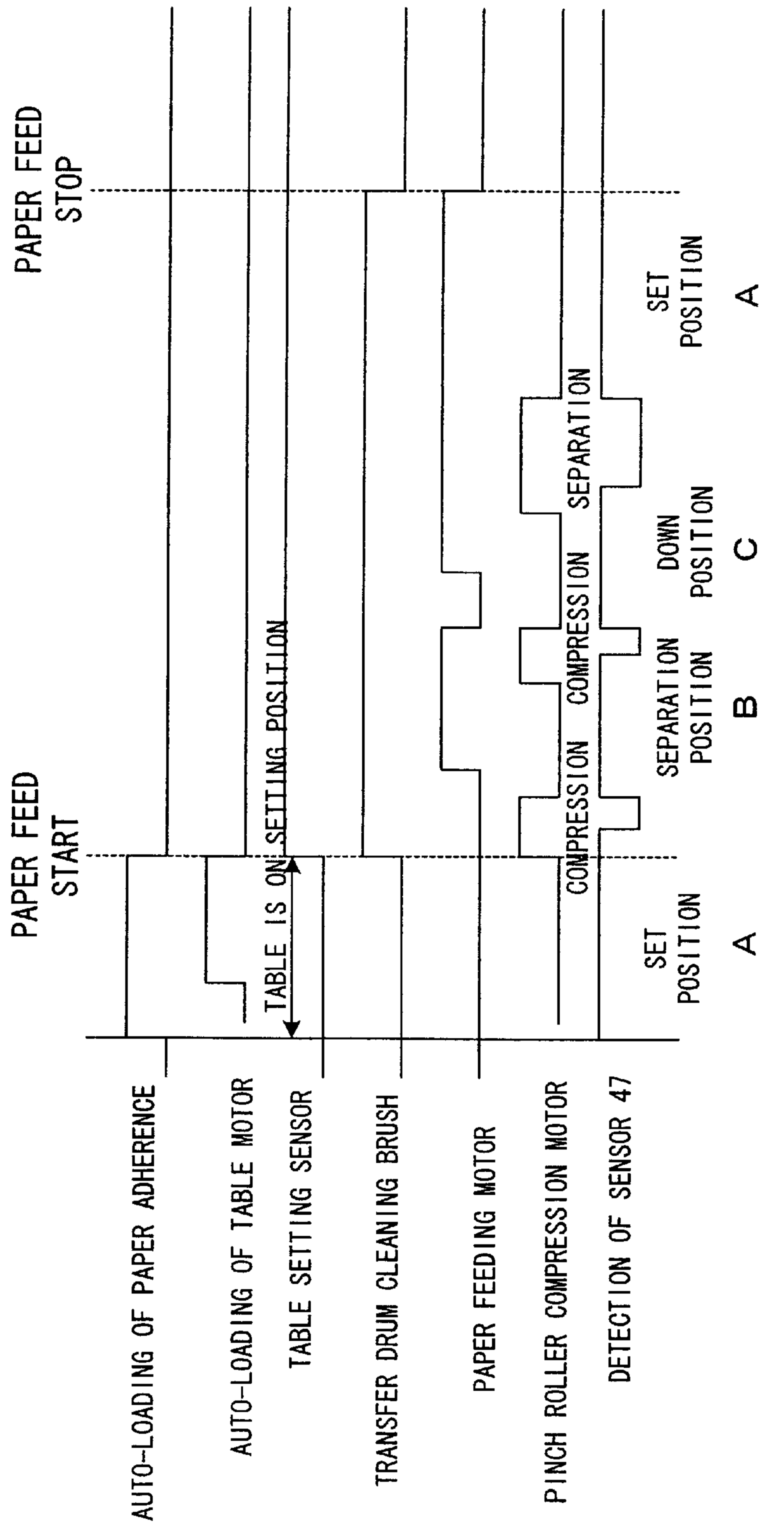
FIG. 7 is a timing diagram showing an operation and detection of parts of the printer in accordance with an auto-loading operation.
Figure 8:
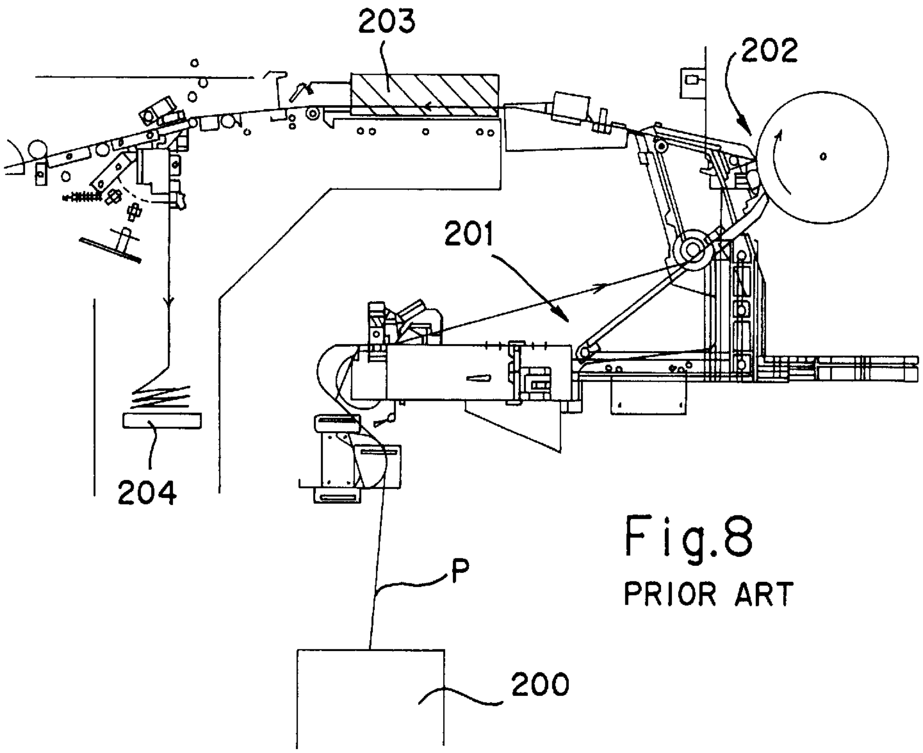
Fig.8 PRIOR ART
FIG. 8 a diagram showing a structure of the printer for a high-speed printer using a continuous, sequence paper.
Figure 9:
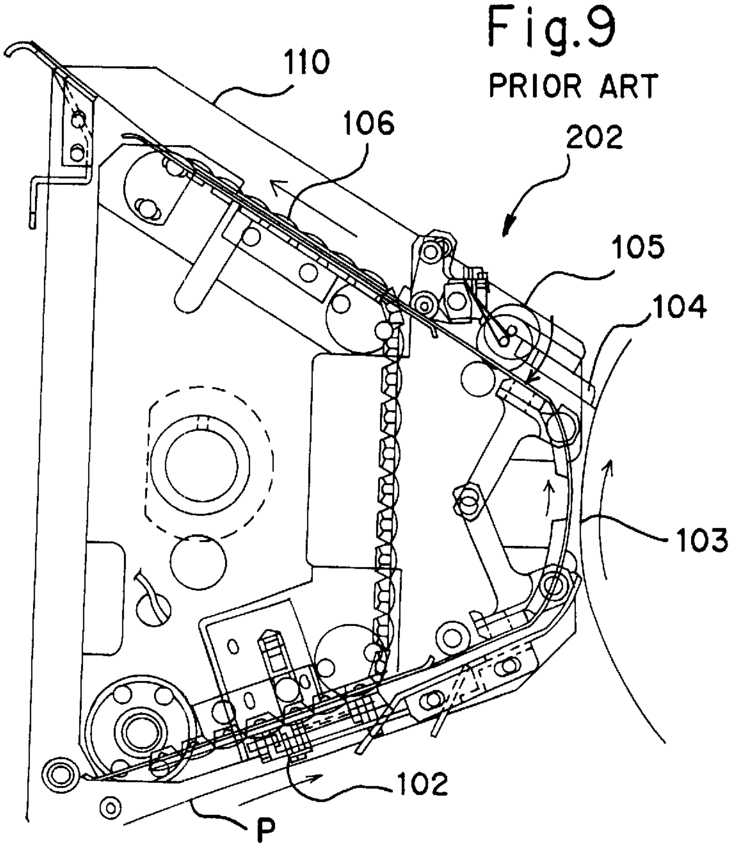
Fig.9 PRIOR ART
FIG. 9 is an explanatory view showing a general operational mode in the transfer portion 202 at an auto-loading operation.
Figure 10:
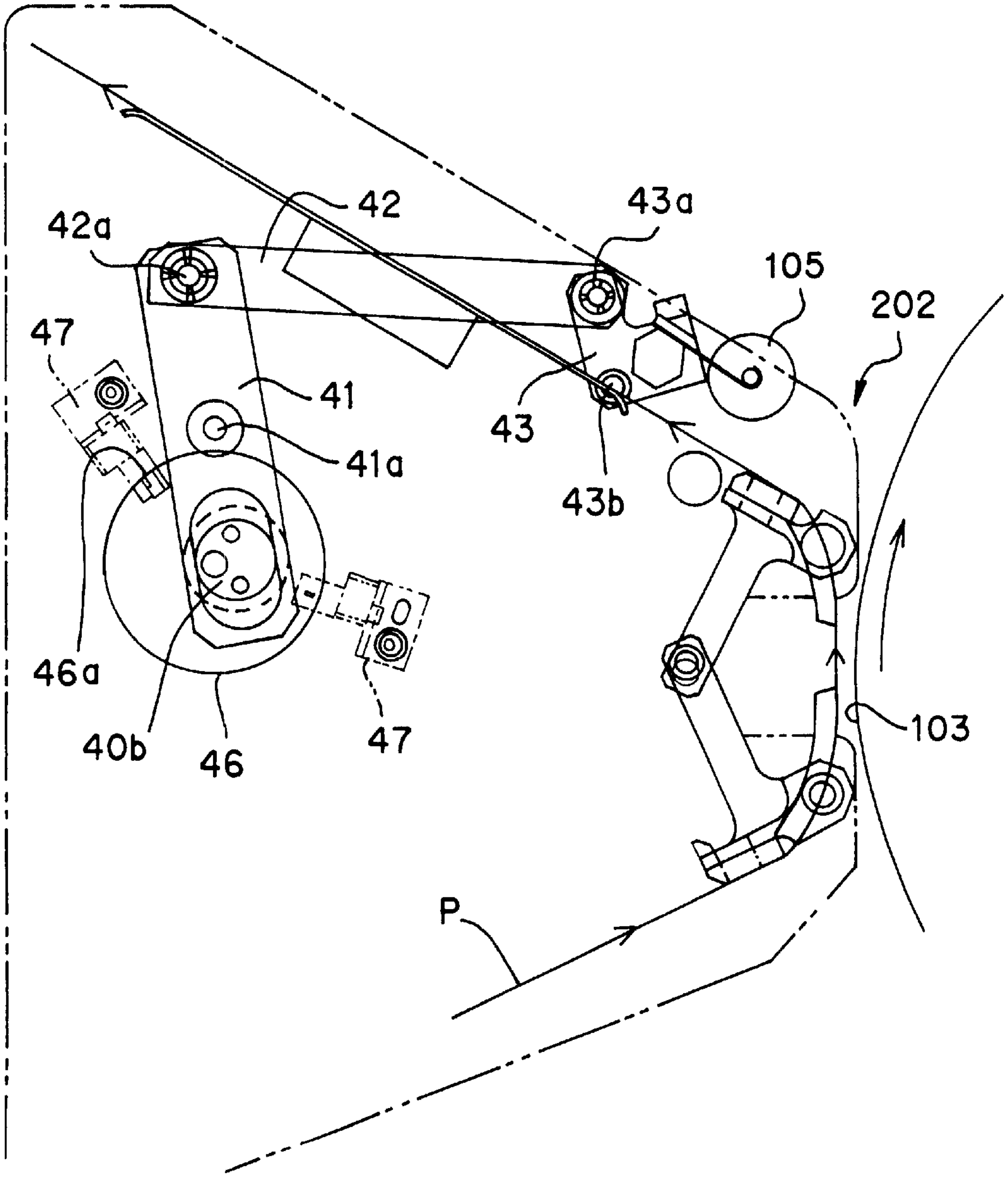
Fig.10 PRIOR ART
FIG. 10 is a diagram which shows a stand-by position of a pinch roller which is shown by reference numeral 105.
Figure 11:
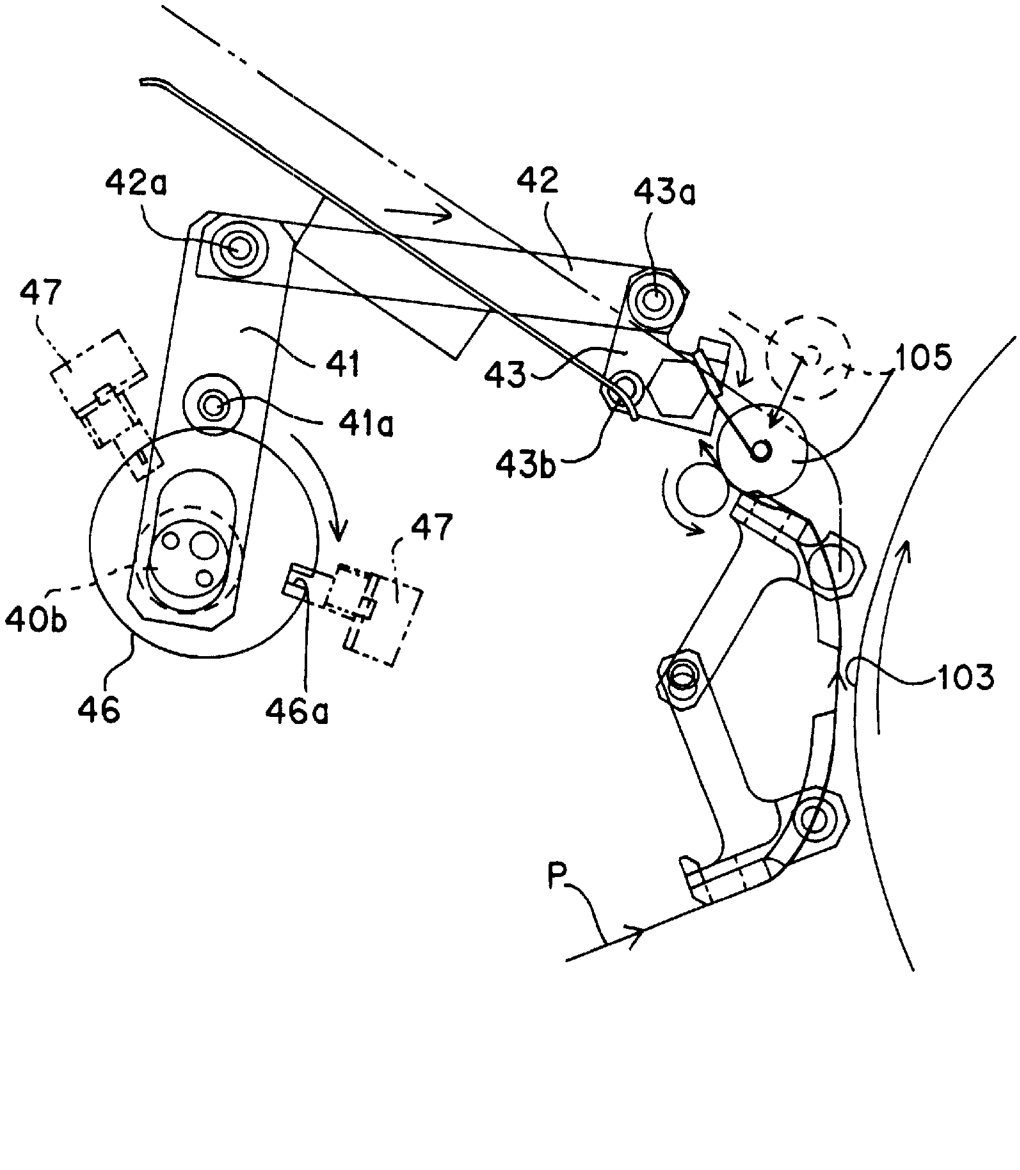
Fig.11 PRIOR ART
FIG. 11 is a diagram which shows a state of the pinch roller at the auto-loading operation.

FIG. 7 is a timing diagram of operations of an auto-loading table motor (not shown), an auto-loading table set sensor (not shown), a cleaning brush 114, a paper feed motor (not shown), a pinch roller compression motor 40 and sensors 47*a*–47*c*. The detection of a set position, a separation position and a down position by the sensors 47*a*–47*c* corresponds to the aforementioned positions A, B, and C. In this diagram, start of the paper feeding represents start of the auto-load operation and the stop of the paper feeding represents a stand-by position for forthcoming printing operation after the auto-loading operation is finished.

As illustrated in FIG. 7, in the timing of a home position A, a paper absorption is made and the auto-loading table motor is driven. When the auto-loading table sensor detects that a paper P is placed on the auto-loading table, the paper absorption operation is stopped and also the operation of the auto-loading table motor is stopped. At this moment, an operation of paper feeding is started and the cleaning brush of the transfer drum 103 starts its operation and, at the same time, the pinch roller compression motor 40 is rotated so that the step of the home position A shifts to the position B.

After the sensor 47 detects the position B, the paper feed motor is driven to feed paper toward the transfer drum 103. Here, the paper P which is contacted with the transfer drum 103 is contacted with the paper separation nail 1 which has been contacted with the circumferential surface of the transfer drum 103, and then separated from the transfer drum 103 and advanced to the pinch roller 2. In this step, the pinch roller compression motor 40 is rotated again so that position B is shifted into position C.

After the sensor 47*c* detects the state of position C, the operation of the paper feeding motor is stopped. In this state, the paper P is already fed through between the pinch roller 2 and the driving roller 3, and the pinch roller 2 is lowered from the position above the paper P to hold the paper P with the co-action of the driving roller 3. Then the paper feeding motor is driven to proceed the paper feeding and, at this moment, the both pinch roller 2 and the driving roller 3 serve to aid the paper feeding operation as described above.

When the holes or apertures of the paper P are successfully engaged with the tractor upper pins 106, a further paper feed aiding operation is no more required and, therefore, the pinch roller compression motor 40 is reversely rotated so that the position is shifted back or returned from position C to position A. During this operation, the paper feed motor is continued to feed the paper P, and the paper feed operation is interrupted to finish the auto-loading operation and, at this moment, the paper P is placed to stand-by for the following printing operation.

In the embodiment of the present invention described above, the paper separation nail 1 and the pinch roller 2 are co-acted (or interlocked) to move and, after the paper separation is made by the paper separation nail 1, the separated continuous paper P is held between the pinch roller 2 and the driving roller 3 so that the driving roller 3 aids to feed the paper and, therefore, a reliable operation of the auto-loading can be made. In other words, the link mechanism 4 which serves to move the pinch roller 2 is provided with another function of moving at the same time the paper separation nail 1, and these operations are conducted by the same and single mechanism, that is, the link mechanism 1. Thus, it is no required to provide different devices, one for operating the pinch roller 2 and the other for operating the paper separation nail 1, and therefore it is not necessary to provide additional devices for synchronizing operation of the two devices 1, 2.

Although the present invention has been described with reference to the preferred embodiments thereof, it should be appreciated that many modifications and alterations can be made within the spirit of the invention.

According to the paper separation apparatus in a feature of the invention, both the paper separation and the paper-feed aiding operation are conducted in an interlocking manner so that the paper separation and the continuous paper feeding are continuously operated. Thus, the present invention can provide a remarkable effect that the auto-loading operation can be carried out reliably and accurately.

In the second feature of the invention, the link mechanism which serves to move the paper feeding supporter device is provided with additional function of simultaneously moving the paper separation body, and these two operations are proceeded by a single link mechanism. Therefore, it is not required to provide different devices which proceeds each of the two operations separately and independently and, moreover, it is not required to provide any additional mechanism or device which serves to perform synchronously the two operations.

Further, in the paper separation method of the present invention, the paper separation step and the continuous-paper feeding step are proceeded in a coactive or interlocking manner, without synchronism between the two operations, to complete an auto-loading operation.

What is claimed is:

1. A paper separation apparatus comprising:

a paper separation body for separating a paper from a transfer body;

a paper feeding supporter device for holding the paper firmly and supporting the feed of the paper; and a link mechanism for, in an auto-loading operation which is performed for setting the paper in a stand-by state for a transfer operation, moving the paper separation body toward a circumferential surface of the transfer body for causing the paper separation body to contact the paper so as to separate the paper from the transfer body and moving at least a portion of the paper feeding supporter device to thereby hold firmly the separated paper, so that the movement of the paper separation body is co-acted in synchronism with the movement of the paper feeding supporter device.

2. A paper separation apparatus according to claim 1, wherein the transfer body is composed of a transfer drum.

3. A paper separation apparatus according to claim 1, wherein the paper feeding supporter device includes at least a pinch roller.

4. A paper separation apparatus according to claim 1, wherein the paper separation body comprises a nail for separating the paper.

5. The paper separation apparatus according to claim 1, wherein the link mechanism includes a plurality of connected pivoted links.

6. A paper separation apparatus comprising:

a paper feeding supporter device for holding a paper and supporting the paper to be fed;

a link mechanism for moving at least a part of the paper feeding supporter device to thereby hold the paper in an auto-loading operation which is performed for setting the paper in a stand-by state for a transfer operation; and a paper separation body for separating the paper from a transfer body so that the link mechanism moves the paper separation body, in synchronism with the paper feeding supporter device, toward a circumferential surface of the transfer body for causing the paper separation body to contact the paper so as to separate the paper from the transfer body immediately before the paper feeding supporter device holds the paper.

7. The paper separation apparatus according to claim 6, wherein the link mechanism includes a plurality of connected pivoted links.

8. The paper separation apparatus according to claim 6, wherein the transfer body is composed of a transfer drum.

9. The paper separation apparatus according to claim 6, wherein the paper feeding supporter device includes at least a pinch roller.

10. The paper separation apparatus according to claim 6, wherein the paper separation body comprises a nail for separating the paper.

11. A paper separation method comprising the steps of, in an auto-loading operation which is performed for setting a paper in a stand-by state for a transfer operation, moving a paper separation body toward a circumferential surface of a transfer body for causing the paper separation body to contact the paper so as to separate the paper from the transfer body, the paper having been fed to the circumferential surface of the transfer body, and moving at least a part of a paper feeding supporter device with a link mechanism in synchronism with the movement of the paper separation body so as to hold the separated paper to thereby support a paper feeding operation.

12. The paper separation apparatus according to claim 11, wherein the link mechanism includes a plurality of connected pivoted links.

13. The paper separation apparatus according to claim 11, wherein the transfer body is composed of a transfer drum.

14. The paper separation apparatus according to claim 11, wherein the paper feeding supporter device includes at least a pinch roller.

15. The paper separation apparatus according to claim 11, wherein the paper separation body comprises a nail for separating the paper.

* * * * *